United States Patent [19]

Kornhauser

[11] Patent Number: 5,607,180
[45] Date of Patent: Mar. 4, 1997

[54] AIRBAG INFLATION DEVICES AND METHODS

[76] Inventor: Murray Kornhauser, 620 Argyle Rd., Wynnewood, Pa. 19096

[21] Appl. No.: 287,335

[22] Filed: Aug. 8, 1994

Related U.S. Application Data

[63] Continuation-in-part of Ser. No. 200,392, Feb. 23, 1994.

[51] Int. Cl.$^6$ .................................................. B60R 21/26
[52] U.S. Cl. .................... 280/736; 280/741; 280/735; 222/3; 180/274
[58] Field of Search ............... 280/728.1, 740, 280/741, 737, 736, 735; 102/530, 531; 222/3; 180/274, 268

[56] References Cited

U.S. PATENT DOCUMENTS

| | | | |
|---|---|---|---|
| 3,603,535 | 9/1971 | De Polo | 280/730.1 X |
| 3,695,665 | 10/1972 | Matsuura | 180/274 X |
| 3,779,577 | 12/1973 | Wilfert | 289/730.1 |
| 3,788,669 | 1/1974 | Usui et al. | 280/237 |
| 3,922,002 | 11/1975 | Lindbert et al. | 180/274 X |
| 4,095,624 | 6/1978 | Davis | 222/3 X |
| 5,098,123 | 3/1992 | Jones | 280/741 |
| 5,146,104 | 9/1992 | Schumacher et al. | 280/735 X |
| 5,295,709 | 3/1994 | Bell | 180/274 X |
| 5,301,979 | 4/1994 | Allard | 280/737 |
| 5,337,674 | 8/1994 | Harris et al. | 280/741 X |
| 5,415,845 | 5/1995 | Brede et al. | 280/741 |

*Primary Examiner*—Christopher P. Ellis
*Attorney, Agent, or Firm*—Duane, Morris & Heckscher

[57] ABSTRACT

Airbag systems for protecting passengers during collision. The airbags are inflated with ambient air at atmospheric pressure in the vehicle cabin. In a preferred aspect, the airbags are interfaced with bladders which store the ambient air and which are compressed by an electromagnetic plate hurling process which compresses the bladder. The airbags can be deployed in any direction and protect the passengers in all places in the vehicle without the dangerous side effects of overpressure buildup.

16 Claims, 7 Drawing Sheets

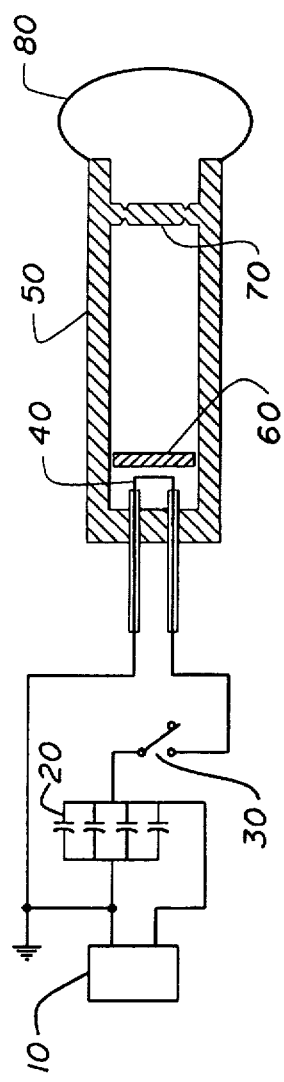
*FIG. 1*
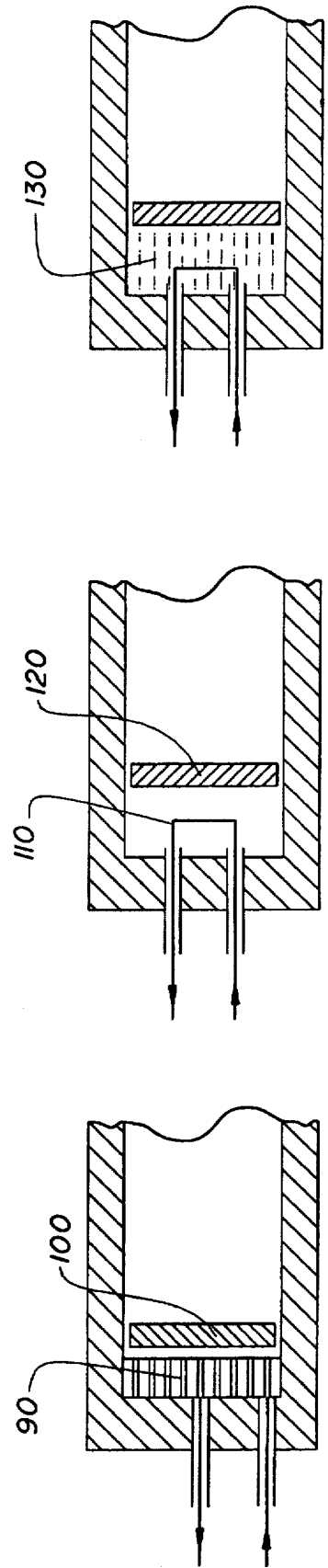
*FIG. 2A*  *FIG. 2B*  *FIG. 2C*

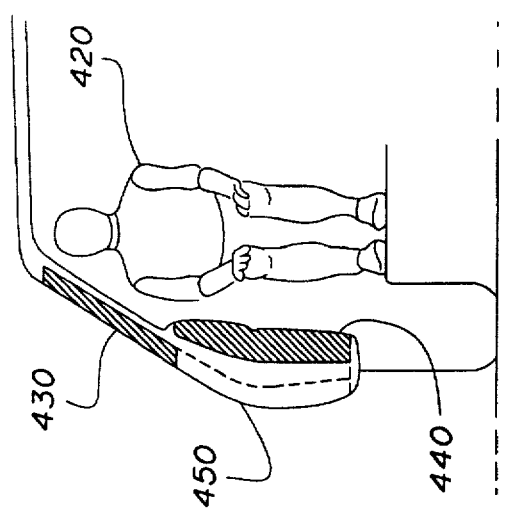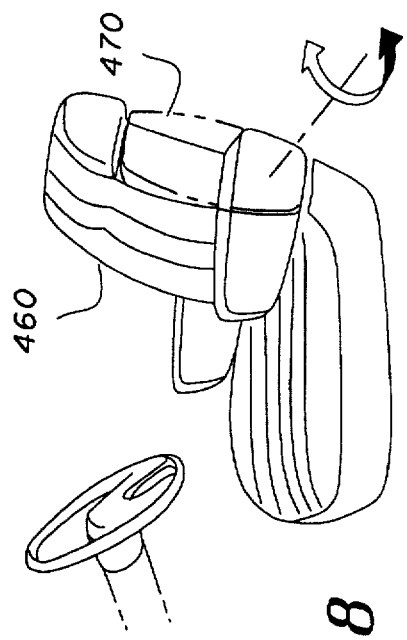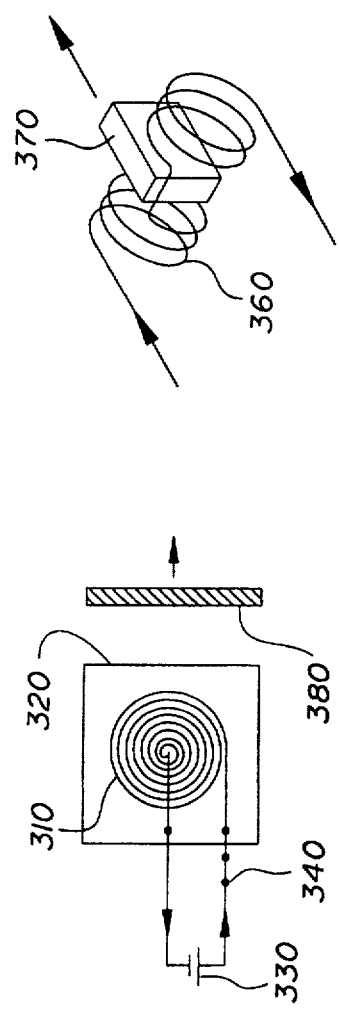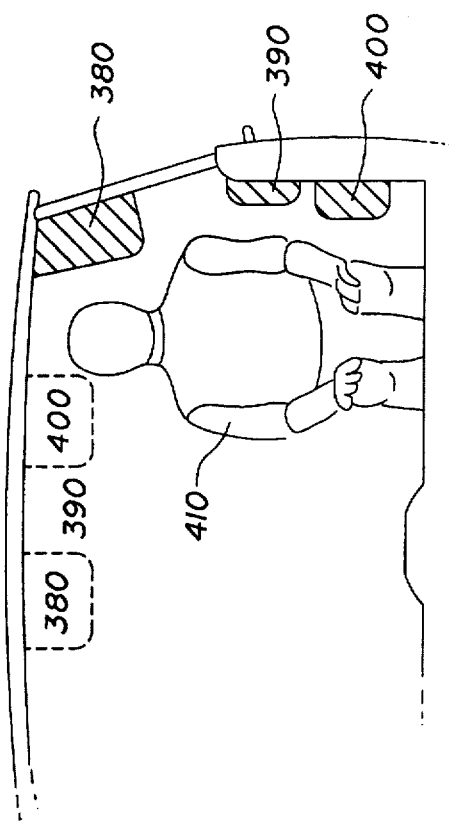

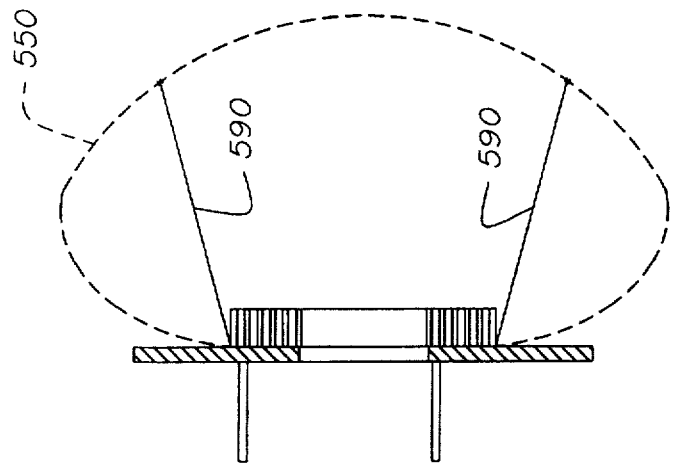
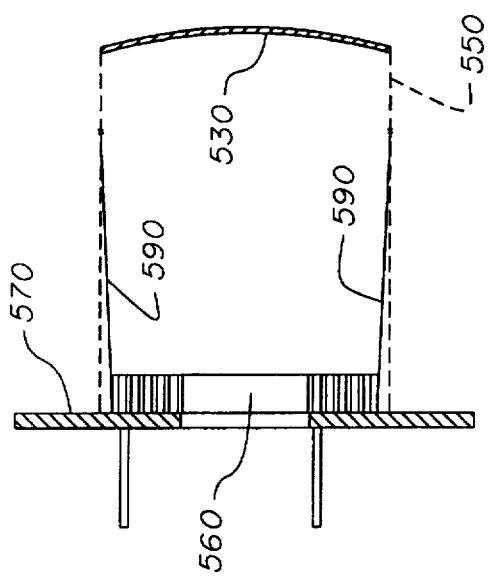
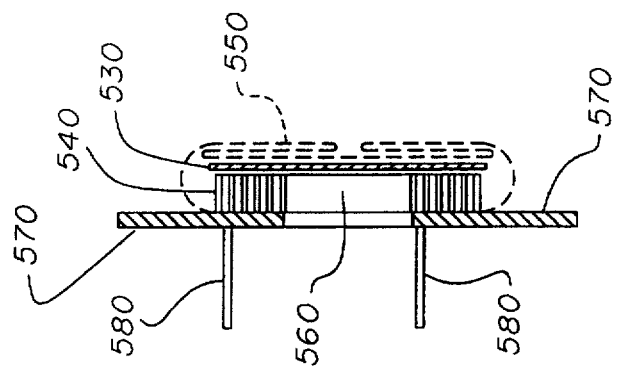

AIRBAG INFLATION DEVICES AND METHODS

RELATED APPLICATIONS

This application is a continuation-in-part of U.S. patent application Ser. No. 08/200,392, entitled "AIRBAG INFLATION DEVICES AND METHODS", filed on Feb. 23, 1994.

FIELD OF THE INVENTION

This invention relates to airbags in vehicles. More specifically, this invention relates to systems for inflating airbags in vehicles.

BACKGROUND OF THE INVENTION

Airbags for automotive vehicles have been mandated by the National Highway Transportation Safety Administration (NHTSA) for many years since they protect passengers in vehicles during the impact phase of an accident. Typically, prior airbag systems comprise an airbag interfaced to a source of airbag propellant which inflates the airbag when a sensor in the system senses a vehicle impact above a certain velocity. The propellant, such as sodium azide, is usually in solid form in a canister. The sodium azide canisters are triggered by a pyrotechnic-type device which ignites the propellant. The burning propellant generates a high pressure gas which is used to inflate the airbag.

Although propellants and compressed gases are the common sources of energy for inflating automobile airbags and other airbag systems, they are potentially hazardous. Not only can they be dangerous in cases of accidental fire, but may prove to be attractive nuisances when juvenile delinquents learn how to use the energetic materials and components to construct weapons.

Another difficulty that arises with the use of propellants and compressed gases to inflate airbags is the effect of overpressure built up in the confined volume of air in the passenger compartment of the vehicle when the airbag inflates. When the bags are inflated with the external compressed gases they displace some of the compartment's air, thereby compressing the air outside the bags. In automobiles, the overpressure becomes dangerous if more than two bags are inflated simultaneously. Overpressure buildup may rupture the eardrums of passengers in the vehicles and cause other injuries. Thus, more extensive application of airbags for rear seats and side panel protection of passengers is not possible in conventional systems using external gases to inflate the airbags.

Inflatable airbags have the advantage of compact stowage before they are called upon to provide protection, and can be deflated rapidly in order to limit the time that they interfere with the driver's vision. Pre-formed cushion materials, such as foam padding, which also protect passengers, have the advantage that their cushioning properties can be tailored to maximize their practical potential in each application. However, they are commonly employed as fixed panels or bolsters or barriers. It would be desirable to combine the advantages of airbags with the advantages of rapidly deployed pre-formed cushions to accomplish complete protection of individuals in vehicles during accidents. Such results have not heretofore been achieved in the art.

SUMMARY OF THE INVENTION

The above-mentioned problems are solved and needs met by airbag systems provided in accordance with the present invention. In a preferred embodiment, the airbag systems protect the passenger during collision, and comprise an airbag which is inflated with ambient air. In a more preferred aspect of the invention, inflation means are interfaced with the airbag for storing the ambient air before a collision. Even more preferably, the inflation means is a bladder.

In a still further preferred embodiment, first means are provided for storing energy which will be used to compress the bladder and thereby inflate the airbag, and a plate is provided interfaced to the first means which will be hurled against the bladder during a collision. Still further, plate means are provided interfaced with the switch means for switching the energy to the plate, thereby causing the plate to force the ambient air from the bladder into the airbag.

In further preferred aspects of the invention, the bladders may be housed in a door of the vehicle. Alternatively, the bladders can be housed in the roof of the vehicle, or the floor of the vehicle. In a further preferred aspect, the airbag can be deployed in a rear direction or a side direction to protect passengers during collision.

Airbag systems provided in accordance with the present invention thus economically and efficiently protect passengers during collision. Furthermore, since ambient air is used to inflate the airbags, the airbag systems are environmentally safe, and remove any dangerous side effects of overpressure when multiple airbags are inflated during collision. The invention will be best understood by reading the following detailed description of preferred embodiments in conjunction with the drawings which are first described briefly below.

BRIEF DESCRIPTION OF THE DRAWINGS

FIG. 1 is a schematic diagram of a system for inflating an airbag.

FIGS. 2A–2C are schematic representations of driver subsystems for compressing air to inflate an airbag.

FIGS. 5A and 5B are alternative embodiments of coils which are used to induce eddy currents to drive plates so that airbags can be inflated.

FIGS. 6, 7 and 8 are schematic representations of preformed cushion systems which can be used to protect passengers and which may be deployed using electromagnetic energy.

FIGS. 10A–10C are a schematic representation of unfolding an airbag and shaping an airbag to obtain maximum frontal area.

DETAILED DESCRIPTION OF PREFERRED EMBODIMENTS

Figure 3:
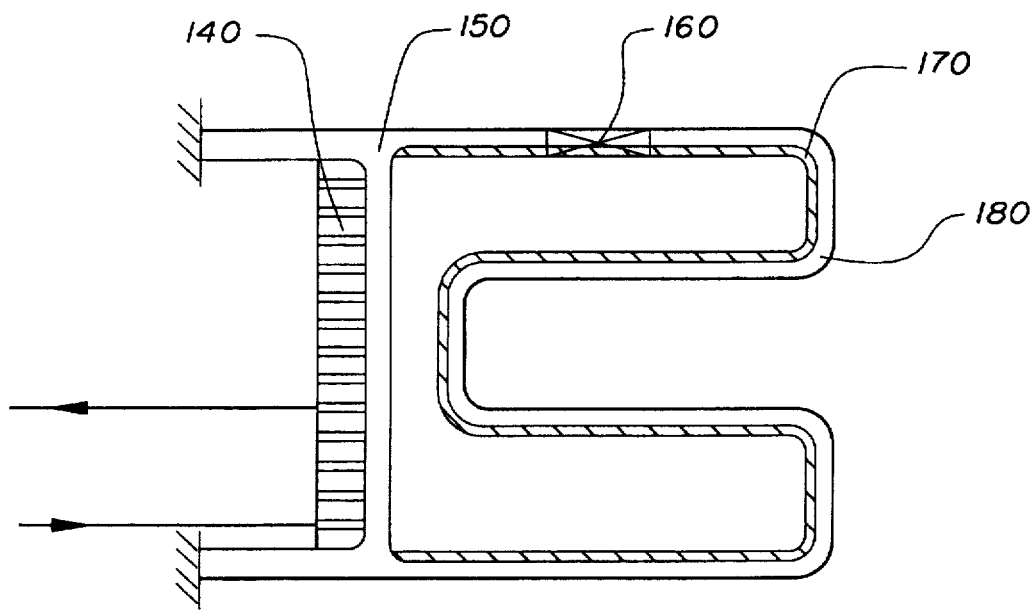
FIG. 3 is a schematic representation of yet another embodiment of a driver subsystem which inflates an airbag that has been first folded.

Referring now to the drawings wherein like reference numerals refer to like elements, the components of an electrical automobile airbag inflation system are shown in FIG. 1. The automobile's electrical system 10, comprising in part the automobile battery, maintains electrical charge on a capacitor bank 20, in readiness for the emergency situation that leads to switch 30 being closed. When switch 30 is closed, the electrical charge is dumped into driver subsystem 40 of air cylinder 50. As used herein, the term "driver subsystem" is any device which causes a mechanical means to be actuated to compress air. The driver subsystem, to be described further, propels piston 60 suddenly and at high speed, compressing the air which was initially contained between the piston and a release valve 70. When the air pressure reaches a high, predetermined value, release valve 70 opens and air drawn from the automobile or other type of vehicle rushes into airbag 80, thereby inflating the airbag.

After the electrical energy enters the driver subsystem, there are several means of converting the electrical energy to the kinetic energy of the piston. One method is electromagnetic as shown in FIG. 2A wherein the driver subsystem is a coil. When the actuating switch 30 is closed, an electrical current is delivered to electromagnetic coil 90. The coil generates an electromagnetic field that induces eddy currents in piston 100, and the eddy currents produce a field that opposes the coil's field. The opposing fields provide repelling forces between the coil and piston, and there forces accelerate the piston away from the coil, thus transferring energy to the piston in the form of kinetic energy. In turn, the piston's kinetic energy is converted to the potential energy of the air as the air's volume decreases and its pressure increases.

An alternate means of converting the electrical energy is to dump the electrical energy suddenly into a metallic circuit element so that the metallic element explodes, generating a high pressure plasma, as shown in FIG. 2B, The plasma consists of vaporized and molten metallic particles that expand at high velocity. Since exploding element 110 is located adjacent to piston 120, the plasma acts a rocket propellant, accelerating the piston to high velocity and high kinetic energy.

A third means of developing pressure on the piston is to fill the cavity behind the piston with a fluid 130, and to locate the exploding circuit element inside the fluid-filled cavity, as shown in FIG. 2C. This approach has been used in electrohydraulic metal forming systems, where a metal blank is used in place of the piston and the blank is hurled against a die at high speed. Pressures as high as 35,000 psi have been measured at a distance of one inch from an exploding wire into which 18 kilojoules of electrical energy has been dumped. Such pressures are more than adequate for accelerating the piston for purposes of compressing the air in the driver subsystem.

If the volume of the driver cylinder is considered to be excessively large, an alternate approach is to employ a reduced, depending on the number of reciprocating cycles employed to inflate the airbag.

The valve that releases the compressed air to enable it to flow into the airbag may consist of a disk that ruptures at a predetermined pressure, or any other valve that operates quickly enough to inflate the airbag. In some applications, the valve may not be necessary at all.

The technology of electromagnetic acceleration of metallic plates has been developed in the field of electromagnetic metal forming, sometimes called "magneforming". In magneforming, the metallic plate is hurled against a die at high enough velocity that the plate deforms to fit the contours of the die. The kinetic energy and the momentum of the plate are the most significant measures of performance of the airbag inflation system. These parameters depend on the inductance, L, of a pancake coil with N turns of conductor, on capacitance, C, of the capacitor bank, and on the applied voltage, V. The impulse that results in the plate's momentum is proportional to these parameters according to the following equation, for thick plates:

$$\text{Impulse} = KN^2V^2C^{1.5}L^{-0.5}.$$

Constant K depends on the properties of the metallic plate material, primarily its electrical conductivity. In addition, experiments with thin plates indicate that the exponents in Equation 1, which apply to thick plates, cannot be applied accurately to predict the performance of thin plates. For this reason it has been necessary to conduct experiments with many metals and many plate thicknesses. Aluminum and copper plates have been found to be practical for airbag inflation applications.

As indicated by Equation 1, impulse delivered to the plate depends on the coil parameters N and L, as well as capacitance C and voltage V. There exists, therefore, a great flexibility in designing electromagnetic systems, depending on the application for which the system is intended. At the present time, great strides are being made in developing low volume, high capacity capacitors, which will make electromagnetic devices more practical than they can be at present.

A substantial volume of air must be compressed by the driver subsystem in order to fill the airbag. If the air compression thermodynamics were identical with the thermodynamics of the flow process between the driver and the airbag, the driver volume would be equal to the airbag volume. In fact, the driver volume is somewhat smaller than airbag volume, since the thermodynamic processes are different. Air is compressed isentropically by the driver subsystem, but it expands into the airbag in a throttling process, at constant temperature, after the release valve functions. The following table is an illustration based on delivering one cubic foot (1,728 cu. in.) of 10 psi air to an airbag, requiring approximately 12 kilojoules of electrical energy to operate the drive subsystem.

TABLE 1

| DRIVER SUBSYSTEM PARAMETERS FOR 1 CU. FT., 10 PSI BAG | | | | |
|---|---|---|---|---|
| Volume of Compressed Air, in$^3$ | 1 | 3 | 10 | 30 |
| Peak Pressure, psi | 42,700 | 14,200 | 4,270 | 1,420 |
| Total Driver Volume, in$^3$ | 298 | 409 | 584 | 814 |
| ½" Thick Al Piston Vel., ft/sec | 487 | 438 | 390 | 349 |

An alternate embodiment of the invention is shown in FIG. 3, wherein the driver subsystem 140 provides repulsive forces against a folded airbag 150, causing the bag to inflate and thereby draw air into the bag through flapper or slider valve 160. The material of the airbag consists of a metal foil layer 170 inside a flexible, impermeable outer layer 180 which is strong enough to withstand the inflation forces and to withstand the air pressure developed inside the airbag when the bag performs as a cushion and the air becomes compressed. When the inflated bag performs as a cushion, flapper valve 160 prevents the air from escaping from the bag.

In FIG. 3, the driver subsystem is shown outside the bag; alternatively, the driver subsystem may be inside the bag.

also in FIG. 3, the bag is shown built-in to a supporting structure; however, the bag may be clamped during inflation and made removable from the inflating system. Only one fold is shown in FIG. 3, but many folds may be used, depending on how large an inflated bag is desired.

Figures 4A, 4B:
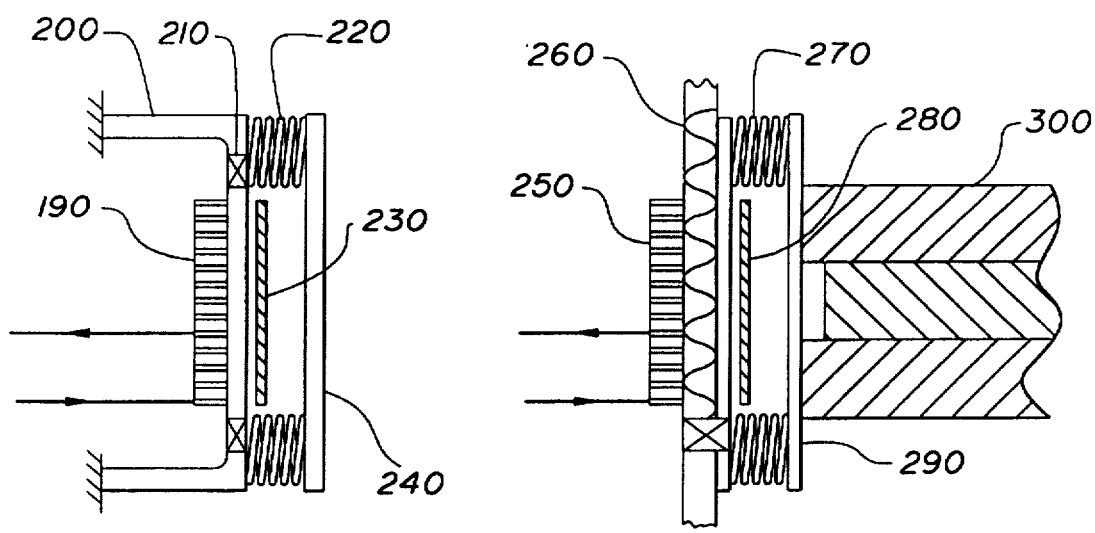
FIGS. 4A and 4B are schematic representations of driver subsystems which utilize electromagnetic energy to inflate airbags.

FIG. 4A shows an alternative configuration of the elements of FIG. 3. The airbag consists of rear panel 200 containing one or more valves 210, bellows 220, and front panel 240 made of a soft compliant material. Electromagnetic coil 190 repels metallic plate 230, which is thin enough to be very flexible, to impact on front panel 240 in order to inflate the bag.

FIG. 4B shows how the electromagnetic inflation system may be applied for efficiently loading boxes with merchandise that must be cushioned from mechanical shock during shipping. The purpose of this application is to eliminate the storage volume and manual labor requirements of packing with plastic "popcorn", and to eliminate the labor of attaching compressed air hoses to the packing box if compressed airbags are employed. In FIG. 4B the bag's rear panel may be made integral with the side 260 of the corrugated box, and the corrugated boxes may be stored and delivered with airbags in their collapsed and flat configuration, attached to each side panel and top and bottom panels. FIG. 4B shows a side panel of a shipping box, with several boxes 300 of merchandise loaded inside the box, some of them bearing directly against the bag's inner panel 290. Electromagnetic coil 250 is located outside the shipping box, and it can repel flexible metallic plate 280 without requiring any connection to the box. When metallic plate 280 strikes the bag's inner panel 290, the airbag expands and the flexible panel 290 conforms to the shapes of merchandise boxes will be cushioned on all sides.

It is preferred to use electromechanical deployment mechanisms, rather than the potentially hazardous and polluting propellants commonly used to inflate automobile airbags or to provide explosive actuation of dynamic devices, for reasons of safety and environmental responsibility. More preferably, rather than considering solenoids which are relatively slow-acting, electromagnetic coils can function rapidly enough to provide protection in the dynamic crash environment. FIGS. 5A and 5B illustrate the kinds of electromagnetic coils that may be employed as motors to drive cushion deployment mechanisms and airbags in accordance with the present invention.

FIG. 5A depicts flat spiral coil 310, commonly called a "pancake coil," mounted on support structure 320, and supplied with electrical energy from battery or capacitor 330 when switch 340 closes in response to a signal from a crash sensor located on board the vehicle. When current flows from the power supply 330 into coil 310, an intense electromagnetic field is generated, and this field induces eddy currents in metallic plate 350 which is located initially adjacent to the surface of pancake coil 310. The currents in plate 350 interact with the currents in coil 310, forcing plate 350 violently away from coil 310. Flying plate 350 has momentum and kinetic energy which may be employed to drive a variety of cushion deployment or airbag inflation mechanisms.

FIG. 5B depicts an alternate kind of electromagnetic coil, consisting of helical coil 360 and slider plate 370 inserted within the coil. In this case, the coil's currents interact with the induced currents in the plate to accelerate the plate edgewise away from the coil. This slider plate system may also be employed to drive a variety of cushion deployment mechanisms.

Power supply 330 may consist of a capacitor, which stores electrical energy at relatively high voltages, or a battery that stores electrical energy at lower voltages. In either case, the energy is delivered to the electromagnetic coil in a relatively short time, on the order of 1 to 10 milliseconds. The power supply could even be an inductive coil which stores energy. Flying plate velocities may be from zero to more than 500 meters per second, depending on the application of its motor function.

In automotive applications, pre-formed cushions are often applied more easily for side impact crash protection, since side visibility is not imperative for the driver who is attempting to control the vehicle during the crash event. For frontal impact protection, however, it would be important to remove the cushions that could interfere with the driver's vision, and that could prove difficult after passengers have impacted against the cushions. For this reason, practical embodiments of the invention are cited herein which illustrate protection against injury caused by side impacts, even though applications for frontal protection are possible, particularly for rear seat passengers.

FIG. 6 shows passenger 410 seated beside a door and window protected by foam pad 380 for head protection, foam pad 390 for thoracic protection, and foam pad 400 for protection of the lower extremities. Note the differences in thickness of the foam pads, designed to prevent large relative deflections between body segments. The neck and spinal vertebrae are particularly vulnerable to bending of the head relative to the torso, and pad 380 is therefore made especially thicker than pad 390. Pads 380, 390, and 400 are preferably stowed under the car roof as shown in dashed outline, prior to deployment.

Upon receiving the proper signal for side impact the pads deploy along tracks installed under the car's roof to their proper positions along the side of the car, in the manner of a roll-top desk. Each pad may be segmented to permit easy motion around the curve from the roof top to the side of the car. Also, the pads in their stowed location under the car's roof provide protection against head impact caused by vertical bounding or by car rollover.

In FIG. 7, the protective pads 430 and 440 are stored inside door 450, where pad 430 is shown in dashed outline inside the door and pad 440 is shown in its initial and final position. Upon receiving the signal for side panel deployment, pad 430 is pulled upward by an electromagnetic motor in order to provide side impact protection for passenger 420.

FIG. 8 shows one possibility of pad stowage in car seat 460, where pad 470 is rotated downward to provide thoracic protection. Alternatively, for head protection pad 470 may be rotated upward. In either case, the electromagnetic driver system may be located within car seat 460. Pads 380, 390, 400, 430, 440, and 470 may all be deployed with electromagnetic driver subsystems as substantially described above, even if air is not needed to inflate the cushions. In this fashion, the electromagnetic energy is employed to simply move the cushion.

Although pre-formed cushions may be applied for side impact crash protection, as shown in FIGS. 6–8, these protective functions may also be accomplished with inflatable airbags. The main advantage of inflatables over pre-formed cushions is that they are deflated rapidly after the crash, thereby removing any possible impediment to passenger egress from a damaged vehicle that might be in danger of fire.

When ambient air is drawn into a rapidly expanding airbag through an orifice, there is a pressure drop across the orifice, leading to momentary below-ambient pressure inside the airbag. Since the flexible airbag fabric cannot sustain any appreciable pressure difference, there is a tendency for the fabric of the sides of the driver plate to crumple inward. It is desired to create a frontal bag area as large as possible however to cope with oblique collisions and to accommodate passengers who may not be located opposite the airbag's central axis. Therefore, means must be provided to shape the airbag with a large frontal area, despite the tendency for inward crumpling caused by negative air pressure. Several methods may be employed to either force the airbag's fabric out laterally, or to increase the airbag's internal pressure, or both.

Methods of increasing internal airbag pressure above ambient pressure include the use of stored gas, such as small gas generators. Although it must be noted that addition of pressurized gas to the airbags will produce some overpressure in the passenger compartment, the amount of overpressure can be made just smaller than if all the airbag inflation had been accomplished with propellants. Another method of producing a small positive pressure inside the airbag is shown in FIG. 9.

Figure 9:
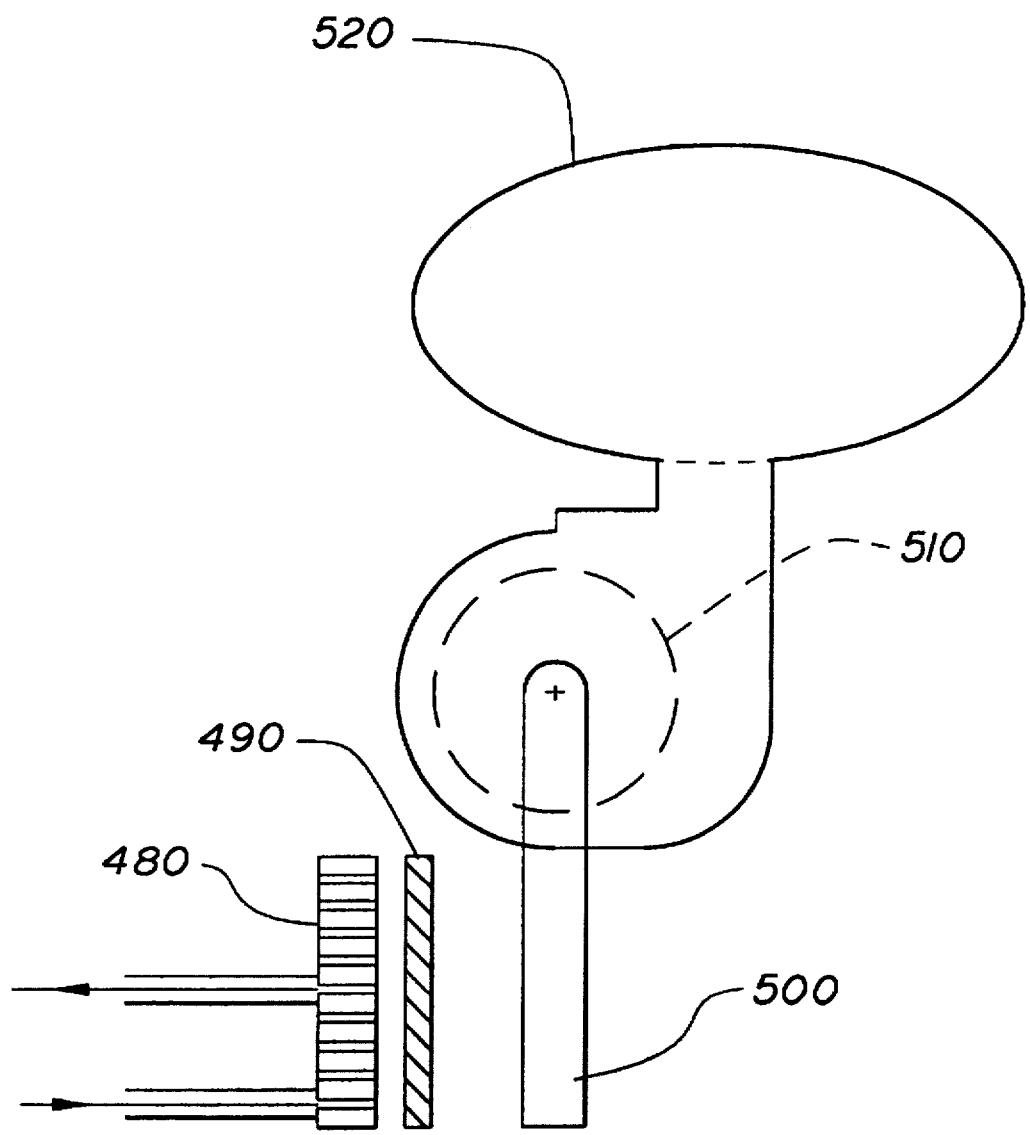
FIG. 9 is a schematic representation of a driver subsystem which uses a rotary blower to inflate an airbag.

In FIG. 9, the driver subsystem 480 which preferably is a coil propels plate 490 against accelerator rod 500 which is attached rigidly to a shaft that drives rotary blower 510. When plate 490 impacts on rod 500, its linear momentum is transferred as angular momentum of the rod and the blower wheel, and the blower wheel is accelerated very rapidly to a high enough speed to inflate airbag 520. Although coil 480 may be employed to drive accelerator rod 500 directly, the extremely short loading duration may result in structural damage to rod 500 and wheel 510. One purpose of employing plate 490 is therefore to increase the loading duration on rod 500 by virtue of the plate's flexibility, thereby reducing the forces applied to rod 500.

In some embodiments of the invention, such as is shown in FIG. 3, the frontal area of the airbag 550, shown in FIGS. 10A–10C, will be approximately equal to the area of electromagnetic coil 540, because the air that has been drawn into the bag through a valve such as that shown at 160 in FIG. 3 will be slightly below the ambient pressure existing inside the car's passenger compartment and, therefore, there will not be any tendency for the bag's internal pressure to force the sides of the bag to bulge out laterally. Increasing the airbag's frontal area may be advantageous in providing protection in oblique automobile collisions.

Referring again to FIGS. 10A–10C, an embodiment of the invention is shown where an airbag's frontal area is increased so as to protect out of position passengers or for protection in oblique automobile collisions. In a preferred embodiment, a thin aluminum plate 530 is located against the face of an electromagnetic coil 540. The airbag 550 is folded with its front face in contact with plate 530. An orifice 560 is open to the ambient atmosphere in the passenger compartment and is adapted to transfer air to the airbag from the passenger compartment as the plate 530 opens the airbag 550. The entire apparatus is mounted on a mounting surface 570 which is conventionally a steering wheel.

When energy is dumped into coil 540 through terminals 580 from a battery or capacitor, the electromagnetic field induced in coil 540 repels plate 530 at high velocity into the airbag 550, thereby pulling airbag 550 open. The action of plate 530 as it moves through airbag 550 causes air to be pulled through orifice 560 as to inflate the airbag. As the airbag is opened, the bag is stretched forward and elastic tethers 590 which are interfaced to the mounting surface 570 and to a multiplicity of points inside the airbag are extended. Referring specifically to FIG. 10B, as elastic tethers 590 are stretched within the airbag, airbag 550 inflates to atmospheric pressure through orifice 560. When the airbag is fully inflated, an orifice valve (not shown) is closed before tethers 590 begin pulling the airbag back, thereby preventing air from leaving airbag 550.

In FIG. 10C, it can be seen that the airbag 550 now has a larger frontal area. In addition, the volume encompassed by the flattened shape in FIG. 10C is smaller than the volume in FIG. 10B, thereby compressing the air in the bag. While the air pressure in the airbag may be slightly above atmospheric pressure, no overpressure exists in the passenger compartment since all the air inside the airbag 550 comes from the passenger compartment. Thus the embodiments of FIGS. 10A through 10C provide for increased frontal area to protect passengers other than those directly in front of the airbag during oblique automobile collisions.

Figure 11A:
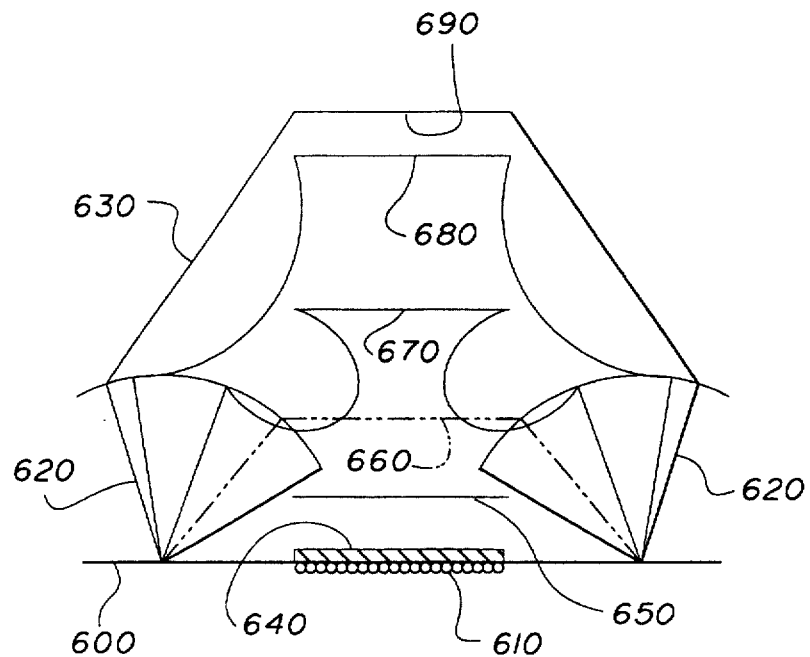
FIGS. 11A and 11B illustrate the sequence of airbags being opened and which are shaped by the inertia of ribs.
Figure 11B:
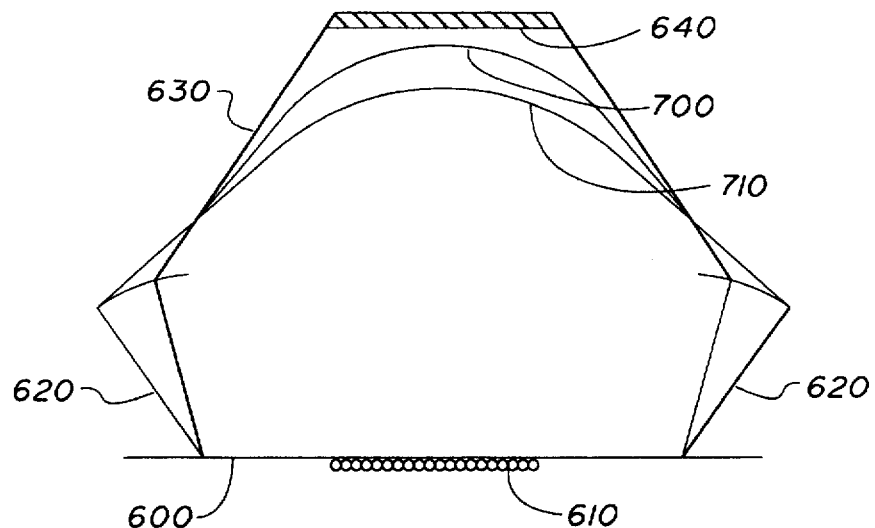

FIGS. 11A and 11B illustrate the inflation sequence of a typical driver's airbag, which consists of two circular panels of fabric sewed together at their outer diameters. The rear panel 600 has a central hole with a diameter larger than coil 610, through which air is drawn into the airbag during inflation. The outer diameter of the central hole in the rear panel is affixed to the airbag's supporting structure by means of a heavy ring, to which are hinged a multiplicity of ribs 620. The ribs are spaced evenly around the periphery of the ring, and each rib is attached to the fabric 630 of the rear panel of the airbag.

The function of the ribs 620 is to transfer inertial momentum to the airbag for two purposes to impart lateral spreading motion to the airbag, and also to pull the front of the airbag backward after plate 640 has pulled the airbag out to its maximum stroke, thereby increasing the air pressure inside the bag above the ambient pressure inside the car's passenger compartment. In the initial position shown at 650 of FIG. 11A, the airbag containing ribs 620 is folded flat against plate 640, which is adjacent to coil 610. The plate 640 is accelerated away from the coil 610, it imparts rotational velocity to ribs 620 at the same time as it imparts linear velocity to the front panel of airbag 630. As the plate 640 is still pushing the ribs rotationally and the airbag axially during opening at 660, until the plate flies clear of the ribs. Finally, at 670 and 680, the plates momentum is pulling the front of the bag axially and the ribs' momentum is pulling the airbag laterally. In the open position at 690, the airbag fabric has been pulled taut. At this time it is intended that the ribs contain more momentum than the plate, in order to stop the axial motion of the plate and also to pull the front of the airbag back.

In FIG. 11B at position 700, the airbag has been squeezed by the outside air pressure to a shape consistent with equalized pressured inside and outside., In position 710, all the momentum of the ribs has been expended, and the pressure inside the airbag is above the ambient pressure outside the airbag. Detents may be required to hold the ribs back in this position, if it is desired to maintain more than ambient pressure with the airbag.

As discussed above, prior art airbags are inflated with a high pressure gas derived from the combustion of sodium azide. Sodium azide is highly toxic in its solid (pre-combustion) form, and caustic particles are sprayed into the passenger compartment during airbag inflation if complete combustion does not occur. The EPA has not yet ruled on the acceptability of sodium azide, probably because there are currently no substitutes available.

When these prior art airbags are inflated in a closed passenger compartment (which occurs in winter, and in summer when air conditioning is being used), the air pressure level increases. Overpressure can be damaging to the ears when more than two airbags are deployed. The overpressure problem has inhibited the use of airbags for side impact protection and in the rear seats, despite the obvious demand for increased levels of protection.

The "out-of-position-passenger problem" exists when the driver or a passenger is located too close to where the airbag emerges from the steering wheel or dashboard. Facial abrasions are common, and fractures and fatal injuries have also occurred. Airbag deployments have occurred during non-crash driving and even when a car was being started. Some of these failures of the sensing and triggering systems caused injury, prompting lawsuits.

In accordance with the preferred aspects of the present invention, the use of electromagnetics to deploy true "air" bags solves the above-mentioned problems. This is accomplished since the invention employs "green" technology, using the car's own air as the medium inside the airbag. Further, zero overpressure is generated. Proximity sensors will be used for purposes of warning passengers that they are too close to an airbag-emerging location, and preventing inflation if the passenger does not move away. This is similar to the "safing and arming" systems used in artillery pieces, with requirements for less than one-in-a-million failures. Finally, by using several independent "safing and arming" elements, undesirable airbag deployments will be prevented. The electromagnetic elements that perform the same functions as the propellant subsystems in current use will undoubtedly be less expensive. In alternative embodiments, simple mechanical springs could be used to propel the plate against the airbag or other element which will cause the airbag to inflate. In this manner, pure mechanical energy can be used to inflate the airbag, thereby also preventing the toxic effects of prior inflation systems.

By building airbags into automobile seats, the advantages of inflating airbags with stored ambient air will be realized. Weight savings and flexibility are primary advantages, and these are important considerations for automotive airbag systems. Further, enhanced safety and reliability will be achieved when such airbags are placed in automobile seats. In accordance with the present invention, it is preferable to use a bladder or bellows system to store ambient air in a passenger compartment of a vehicle for inflation of the airbag.

Figure 12A:
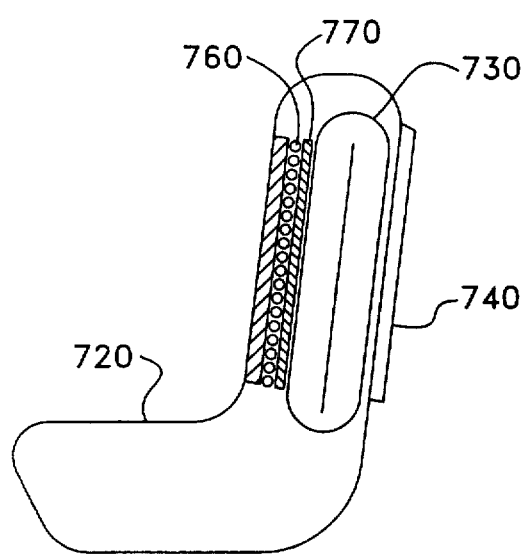
FIGS. 12A and 12B show airbag system having a bladder for inflating the airbag with ambient air.
Figure 12B:
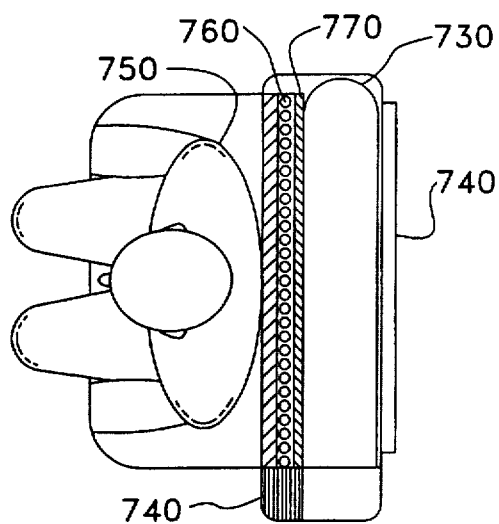

Referring to FIGS. 12A and 12B, a passenger seat 720 in accordance with the present invention is shown. In a preferred embodiment, ambient air at the same pressure as the air in the passenger compartment is stored in a bladder 730. Bladder 730 communicates directly with an airbag 740 which is adapted to be deployed both rearwardly from the seat to protect passengers in the back during collision, and on the side of the passenger so that in case of a side impact collision, the passenger 750 will be protected.

A large orifice which preferably has the same height and thickness as air bladder 730 is provided so that the air can escape from air bladder 730 into airbag 740. As was discussed earlier, a driver system composed of a spring, or of a pancake coil or other appropriate coil 760 is interfaced to a sensor and triggering system so that a plate 770 will be hurled against bladder 730, thereby compressing bladder 730 and squeezing the ambient air in bladder 730 into airbag 740.

Figure 13A:
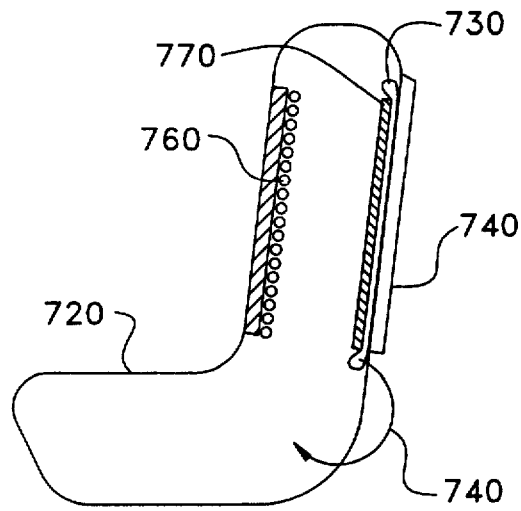
FIGS. 13A and 13B show the airbag system of FIGS. 12A and 12B as the airbag is being inflated.
Figure 13B:
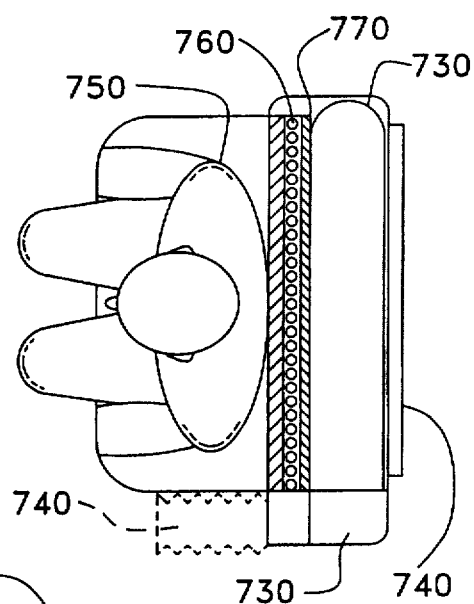

FIGS. 13A and 13B illustrate the occurrence of plate 770 being hurled against bladder 730 during a collision. As can be seen, after coil 760 is energized and plate 770 is hurled against bladder 730, bladder 730 compresses due to the pressure of plate 770, thereby emptying the ambient air into airbag 740. As can be seen in the top view of FIG. 13B, airbag 740 begins to expand rearwardly towards the passengers in the back seat, and may also expand sideways in the case of a side impact collision or other type of collision where it is necessary to protect passenger 750 from a side-impact collision.

Figure 14:
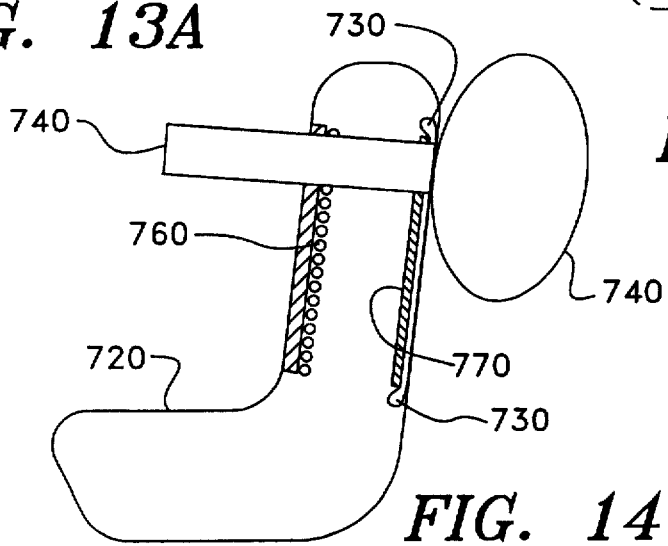
FIG. 14 shows the airbag system of FIGS. 12A and 12B fully inflated.

As shown in FIG. 14, the airbag 740 is fully deployed in the rear and side directions to protect a passenger sitting in the seat 720, and the passengers behind seat 720. It should be recognized by those with skill in the art that separate airbags could actually be used in a situation where it is not desired to protect the passengers in the back seat, but it is only desired to protect the passenger 750 in seat 720 from rear and side collisions, or vice versa. All such embodiments are intended to be within the scope of the present invention.

In a further preferred embodiment, when the distance traversed by plate 770 is smaller than the distance the airbag extends as it is deployed, the plate's velocity may be much smaller than the velocity the airbag must have to extend its full length in order to be deployed very quickly. For example, if the side airbag is required to extend 18 inches in 10 milliseconds, its velocity of extension must be 150 feet per second, or 45.7 millimeters per second. If however, the bladder is initially only 6 inches thick, the average velocity of bladder compression is only 50 feet per second, or 15.2 meters per second. Thus, the lower the plate velocity, the lower the pressure buildup in the bladder as the bladder is compressed dynamically by plate 770.

Similar applications of bladder 730 to airbags may be applied to bladders located in rear seats, doors, dashboards, trunks, or roofs of vehicles, depending upon the design practicality. In all of these applications, it is preferred that the airbag be attached to some surface of the vehicle's interior as it is impacted by the passenger during a collision. It is even possible to locate the bladder within an inflatable seat belt or other airbag attached to the front or side of the passenger. In such configurations, the passenger may be protected from injury caused by head or chest impact against any rigid surface of the vehicle's interior. With an inflatable seat belt, the impulse transmitted to the seat belt wearer would be equal to the impulse required to accelerate the airbag fabric with a velocity sufficient to move the fabric out to its inflated position within the required airbag deployment time. An inflatable seat belt can therefore be deployed safely, provided that it is designed so that the outer layer of its fabric can expand freely away from the wearer.

In accordance with the invention, it is possible to deploy an airbag on an A-pillar located forward and to the left of the driver against a head impact during a crash. In this case, dimensional cushioning or use of a thick foam layer around a pillar would not be acceptable because it would interfere with the driver's vision of the road. However, a bladder located any place in the automobile, for instance, behind a dashboard or roof, could deploy an airbag inside a hollow pillar to protect against impact. Child restraint seats could also be equipped with airbags, which would protect a child against frontal and side impacts. The inflated airbag for a child restraint seat would wrap continuously around the front and sides of the child restraint seat to protect the child during impact.

Airbag inflation systems provided in accordance with the present invention solve a unique need in the art for methods and apparatus to inflate airbags without the need for external and potentially combustible gases. Furthermore, these systems remove the dangers associated with inflating airbags that currently exist, since methods and apparatus provided in accordance with the present invention utilize ambient air in a passenger compartment to inflate an airbag, thereby removing overpressure problems. Such results have not heretofore been achieved in the art.

There have thus been described certain preferred embodiments of airbag inflation devices and methods provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. An airbag system for protecting a passenger during collision, comprising:

an airbag which is inflatable with ambient air;

a bladder interfaced with the airbag for storing the ambient air before the collision;

a first means for storing energy which will be used to compress the bladder and thereby inflate the airbag; and a plate interfaced to the first means which will be hurled against the bladder during a collision.

2. The system recited in claim 1 further comprising switch means interfaced to the first means for switching the energy to the plate, thereby causing the plate to force the ambient air from the bladder into the airbag.

3. The system recited in claim 2 wherein the first means is a capacitor.

4. A system for inflating an airbag in a vehicle comprising:

energy storing means for storing energy which will be used to inflate the airbag;

gas storage means for storing gas to inflate the airbag;

compression means for compressing the gas storage means to cause the airbag to inflate;

an energy delivery means interfaced with the compression means for delivering the energy to the compression means, thereby causing the compression means to be hurled against the gas storage means.

5. The system recited in claim 4 wherein the energy storage means is a battery.

6. The system recited in claim 4 wherein the energy storage means is a spring.

7. The system recited in claim 4 wherein the energy storage means is a capacitor.

8. The system recited in claim 7 wherein the gas storage means is a bladder and the gas is ambient air.

9. The system recited in claim 8 wherein the compression means is a plate.

10. The system recited in claim 1 wherein the energy delivery means is a coil.

11. The system recited in claim 10 wherein the bladder is housed in a seat in the vehicle.

12. The system recited in claim 10 wherein the bladder is housed in a door of the vehicle.

13. The system recited in claim 10 wherein the bladder is housed in a roof of the vehicle.

14. The system recited in claim 10 wherein the bladder is housed in a floor of the vehicle.

15. The system recited in claim 10 wherein an airbag is deployed in a rear direction.

16. The system recited in claim 10 wherein an airbag is deployed in a forward direction for lateral impact protection.

* * * * *